United States Patent
Rankin et al.

(10) Patent No.: US 11,209,057 B2
(45) Date of Patent: Dec. 28, 2021

(54) TORSION BRAKE RETRACTOR, CALIPER AND METHOD

(71) Applicant: PERFORMANCE FRICTION CORPORATION, Clover, SC (US)

(72) Inventors: Paul Rankin, Charlotte, NC (US); Darin Cate, York, SC (US); James Borner, Charlotte, NC (US)

(73) Assignee: Performance Friction Corporation, Clover, SC (US)

( * ) Notice: Subject to any disclaimer, the term of this patent is extended or adjusted under 35 U.S.C. 154(b) by 242 days.

(21) Appl. No.: 16/510,336

(22) Filed: Jul. 12, 2019

(65) Prior Publication Data

US 2019/0331179 A1 Oct. 31, 2019

Related U.S. Application Data

(63) Continuation-in-part of application No. 16/246,227, filed on Jan. 11, 2019.

(Continued)

(51) Int. Cl.
*F16D 65/09* (2006.01)
*F16D 65/00* (2006.01)
(Continued)

(52) U.S. Cl.
CPC ....... *F16D 65/0972* (2013.01); *F16D 65/005* (2013.01); *F16D 65/12* (2013.01); *F16D 65/22* (2013.01)

(58) Field of Classification Search
CPC ............... F16F 65/0972; F16F 65/0068; F16F 65/0975; F16F 65/12; F16F 65/18;
(Continued)

(56) References Cited

U.S. PATENT DOCUMENTS 3,217,841 A * 11/1965 Dotto ...................... F16D 65/46
188/71.7
3,318,421 A * 5/1967 De Hoff .................. F16D 65/52
188/106 F (Continued)

FOREIGN PATENT DOCUMENTS

| EP | 1353084 A2 | 10/2003 |
| WO | 9608663 A1 | 3/1996 |
| WO | 2004097098 A1 | 11/2004 |

OTHER PUBLICATIONS

International Search Report and Written Opinion issued in Application No. PCT/US2019/013334 dated Jun. 26, 2019, 9 pages.

*Primary Examiner* — Robert A. Siconolfi
*Assistant Examiner* — James K Hsiao
(74) *Attorney, Agent, or Firm* — Ditthavong, Steiner & Mlotkowski

(57) ABSTRACT

A brake pad retractor system, comprising, a torsional mount and an adjustable torsion arm having an angular relation with the torsional mount, wherein the torsion arm is sprung responsively to at least some movement of a brake pad and the torsional mount being operative such that upon movement of a brake pad by a first distance, the torsion arm is sprung and communicates an action upon the brake pad through a contact between the torsion arm and the brake pad, the communicated action sufficient to positively retract the brake pad upon release of the brake system, the torsional mount further operative such that upon further movement of a brake pad beyond the first distance the angular relation between the torsion arm and the torsional mount is adjusted responsively to the further movement. Further aspects include a novel a brake caliper and method.

42 Claims, 13 Drawing Sheets

Related U.S. Application Data

(60) Provisional application No. 62/616,953, filed on Jan. 12, 2018.

(51) Int. Cl.
   *F16D 65/12* (2006.01)
   *F16D 65/097* (2006.01)
   *F16D 65/22* (2006.01)

(58) Field of Classification Search
   CPC ...... F16F 2121/16; F16F 65/095; F16F 65/62; F16F 65/005
   See application file for complete search history.

(56) References Cited

U.S. PATENT DOCUMENTS

| | | | | |
|---|---|---|---|---|
| 3,532,190 A * | 10/1970 | Palmer | ................ | F16D 25/0638 188/71.8 |
| 3,613,849 A * | 10/1971 | Pape | ................ | F16D 27/06 192/90 |
| 4,345,674 A * | 8/1982 | Vacval | ................ | F16D 65/18 188/196 P |
| 4,364,455 A * | 12/1982 | Oshima | ................ | F16D 65/095 188/1.11 W |
| 4,415,068 A * | 11/1983 | Gumkowski | ....... | F16D 55/2265 188/216 |
| 4,444,296 A * | 4/1984 | Marianu | ................ | F16D 65/095 188/72.2 |
| 4,491,204 A * | 1/1985 | Dirauf | ................ | F16D 65/097 116/208 |
| 4,658,938 A * | 4/1987 | Thiel | ................ | F16D 65/0977 188/73.35 |
| 4,662,483 A * | 5/1987 | Boeck | ................ | F16D 55/226 188/72.3 |
| 5,069,313 A | 12/1991 | Kato et al. | | |
| 5,186,284 A * | 2/1993 | Lamela | ................ | F16D 55/36 188/1.11 R |
| 5,249,647 A * | 10/1993 | Kobayashi | ............ | F16D 65/092 188/72.3 |
| 5,549,181 A * | 8/1996 | Evans | ................ | F16D 65/097 188/216 |
| 6,286,635 B1 * | 9/2001 | Tamor | ................ | B60L 7/26 180/65.21 |
| 6,378,665 B1 * | 4/2002 | McCormick | ........ | F16D 65/0975 188/72.3 |
| 7,318,503 B2 * | 1/2008 | Farooq | ................ | F16D 65/0974 188/205 A |
| 8,540,060 B2 * | 9/2013 | Hayashi | ................ | F16D 65/097 188/72.3 |
| 9,046,143 B2 * | 6/2015 | Barland | ................ | F16D 65/0031 |
| 9,261,152 B2 * | 2/2016 | Gutelius | ................ | F16D 65/0972 |
| 9,506,514 B1 * | 11/2016 | Tekesky | ................ | F16D 65/0978 |
| 9,512,892 B2 | 12/2016 | Burgoon et al. | | |
| 2002/0043436 A1 | 4/2002 | Burgdorf et al. | | |
| 2007/0137951 A1 * | 6/2007 | Byrd | ................ | F16D 55/2245 188/72.7 |
| 2009/0283372 A1 * | 11/2009 | Matsushima | ....... | F16D 65/0973 188/73.37 |
| 2010/0101905 A1 * | 4/2010 | Monopoli | ............ | F16D 65/563 188/327 |
| 2012/0043168 A1 * | 2/2012 | Narayanan | ............ | F16D 65/092 188/72.1 |
| 2012/0205205 A1 | 8/2012 | Lethorn | | |
| 2015/0008080 A1 * | 1/2015 | Baumgartner | ........ | F16D 55/226 188/72.3 |
| 2016/0053837 A1 * | 2/2016 | Lou | ................ | F16D 65/0978 188/73.38 |
| 2016/0131211 A1 * | 5/2016 | Brandl | ................ | F16D 65/092 188/73.38 |
| 2016/0131213 A1 * | 5/2016 | Comenduli | ............ | F16D 65/62 188/71.8 |
| 2016/0341266 A1 * | 11/2016 | Oliver | ................ | F16D 51/28 |
| 2017/0058978 A1 * | 3/2017 | Demirkol | ................ | B61H 5/00 |
| 2017/0102042 A1 * | 4/2017 | Crippa | ................ | F16D 65/0972 |
| 2018/0156287 A1 * | 6/2018 | Sasaki | ................ | F16D 55/228 |

* cited by examiner

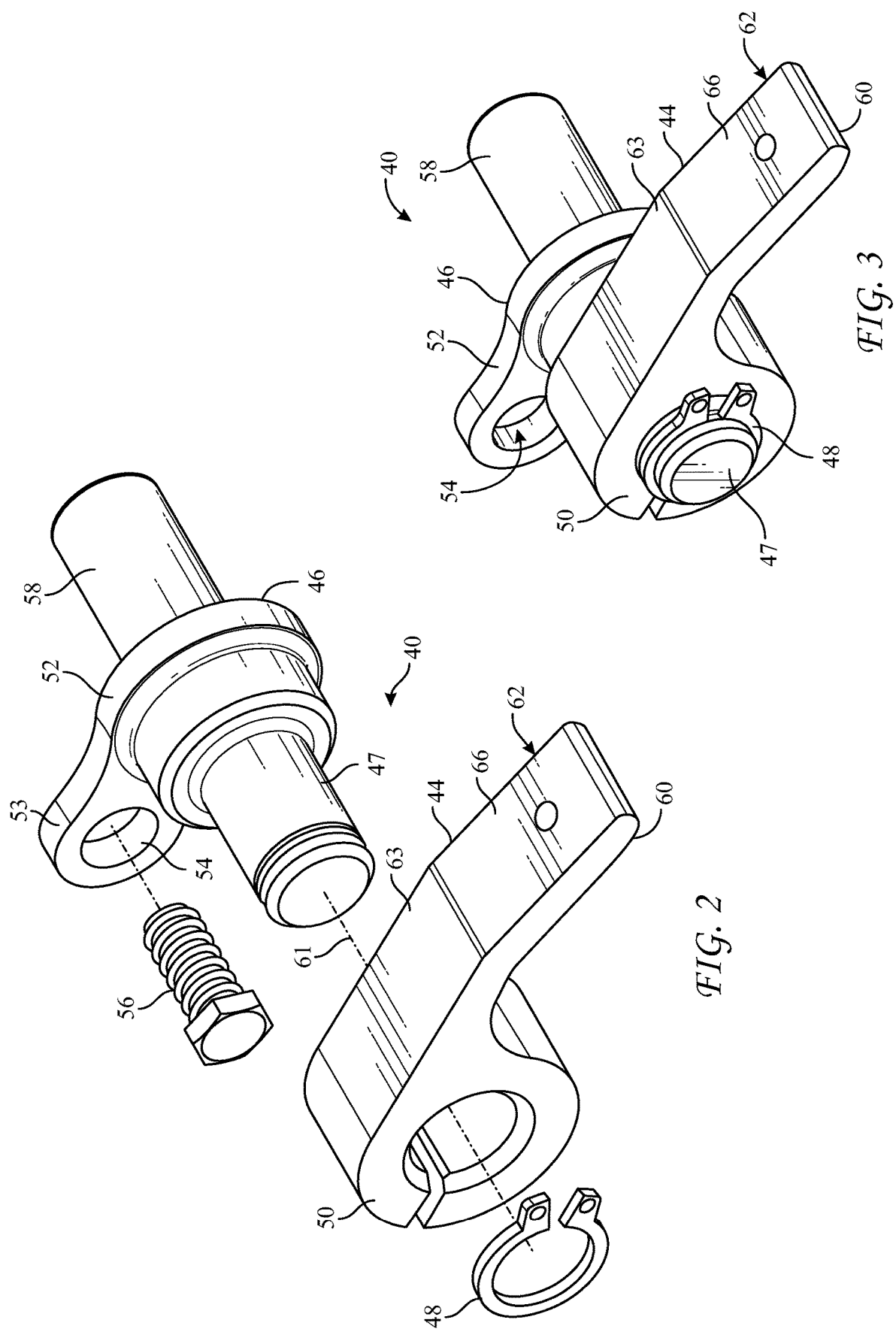

TORSION BRAKE RETRACTOR, CALIPER AND METHOD

This application is a continuation-in-part of and claims priority under 35 U.S.C. § 120 to U.S. application Ser. No. 16/246,227, filed on Jan. 11, 2019, incorporated herein by reference, which claims priority under 35 U.S.C. § 119 to U.S. Provisional Application No. 62/616,953, filed Jan. 12, 2018.

FIELD

This disclosure relates generally to retractors for disc brakes of motor vehicles wherein friction pads are positively retracted after being applied against a rotor disc, and in particular but not exclusively, to retractors for disc brakes of high performance (race) cars, exotic cars and motor cycles.

ENVIRONMENT

Commonly assigned, U.S. Pat. No. 9,512,892 to Burgoon et al., discloses a brake caliper and brake pad timing and retraction controller, which patent is incorporated by reference in its entirety for all purposes to be served herein.

Disc brakes of race cars and other high performance vehicles operate at extreme vehicular speeds and undergo repeated heavy braking actions. The demands of the racing environment favor the development and deployment of brake systems which have a capacity to generate extreme braking action and a capacity to withstand the extreme heat (temperatures at and about the brake rotors may approach about 2000 F.° or more). Yet the brake systems must remain lightweight and reliable. Because of the generation of extreme levels of heat, it is desirable to minimize the transfer of heat from the brake pads to the adjoining structures and other components of the caliper.

The calipers of race cars may be quite arcuate and limited in size to minimize weight, yet may house multiple pistons (10 or 12 or more) in order to achieve a desired level of braking action, leaving little room for additional brake components.

High performance (race) vehicles may also be equipped with brake pads whose back plates are constructed from exotic materials such as a carbon matrix or a carbon fiber matrix and the like, materials which are known to be difficult to drill and tap to establish bores for receiving pins or threaded bolts. Even if such connections were to be manageably established, the extreme thermal loads that are typically experienced by the brake pads would create extreme and possibly destructive loads at the connections, because of differences in thermal expansion between the carbon-based material of the brake pads and the metallic pins or bolts. The ability of a carbon fiber carbon matrix pad to withstand one or repeated threading operations itself is questionable. The brake pads of high performance vehicles also may include state-of-the-art coatings and the like on their backing plate, which would be broached if the backing plate were subject to drilling or tapping.

In braking systems for exotic cars or motor cycles, it may be desirable to extend the friction pads over a relatively long arc to maximize the contact area between the friction material of the pads and the rotor disc. With such vehicles, there may also be a desire to enlarge pads (and rotors) radially such that the pads are not only arcuately extended ("long"), but also "tall".

Multiple caliper pistons may be utilized in conjunction with these comparatively long and tall brake pads to achieve desired levels of uniformity and consistency in extension of such pads into contact against the brake rotors. It is also desirable to retract these long and tall brake pads in a uniform and consistent manner. A retractor affixed to a central portion of a long and tall brake pad may not provide sufficient uniformity and consistency in retraction across the horizontal and vertical extent of the larger brake pad.

In brake systems configured for high performance vehicles, much of the space within a given caliper housing may be committed to placement of the multiple caliper pistons and the components which support their operation. Space availability for other components within the caliper housing may therefore be quite limited.

Accordingly, a need has endured for a brake pad retractor which is configured to provide a uniform and consistent retraction of brake pads, including those which are long and tall, without being fastened to the back plate of the brake pad by a threaded or pinned connection or the like.

Accordingly, another unmet need has endured for a brake pad retractor which operated with brake pads having backing plates constructed of carbon-based materials and/or having special surface coatings without having to drill or tap the backing plate or degrade the coatings.

Likewise, an unmet need has persisted for a brake pad retractor which is sufficiently compact such that it will fit within limited confines of a caliper housing, including those calipers which house multiple pistons and/or are configured for race vehicles.

Similarly, an unmet need has persisted for a brake pad retractor which may be accessed, serviced or adjusted through openings along either or both of the top portion and/or bottom portion of caliper housing.

SUMMARY

An aspect of the present disclosure provides a brake pad retractor system comprising a torsion arm, a torsional mount cooperative with the torsion arm such that the torsion arm has an angular relation with the torsional mount and may be sprung responsively to at least some movement of a brake pad in response to operation of a brake system, the torsional mount being operative such that upon movement of a brake pad by a first distance, the torsion arm is sprung and communicates an action upon the brake pad through a contact between the torsion arm and the brake pad, with the communicated action being sufficient to positively retract the brake pad upon release of the brake system. The torsional mount is further operative such that upon further movement of a brake pad beyond the first distance the angular relation between the torsion arm and the torsional mount is adjusted responsively to the further movement, whereby the positive retraction of the brake pad is maintainable as the brake pad undergoes wear.

In embodiments, the torsion arm may be configured to contact the brake pad free of a rigid connection between the torsion arm and the brake pad and/or the torsion arm may be configured to contact a backing plate portion of the brake pad on a side of the backing plate supporting a friction generating material.

In some embodiments, the torsion arm may be configured to contact a recess in the brake pad.

In various embodiments, the torsional mount may comprise a pin and an arrangement to support the pin from a housing portion of a brake system at a location adjacent a brake pad of the brake system. In those and other embodiments, the torsional mount may rigidly affix the pin with the housing portion and/or a portion of the torsion arm may be supported at the angular relation from the pin by a connection which includes a friction fit such that during the movement of the brake pad by the first distance, the torsion arm may be sprung and the friction fit may maintain the angular relation and such that during movement of the brake pad beyond the first distance, the friction fit may be overcome and the angular relation of the tension arm portion may be adjusted responsively to the further movement.

In some embodiments, the torsional mount may comprise a plate, with the plate being arranged to support the pin such that the pin may rotate relative to the housing portion and with the friction fit being operative between the pin and the plate.

In still further embodiments, the torsional mount may comprise a plate, with the plate being arranged to support the pin such that the pin may be in a fixed relation to the housing portion and with the friction fit being operative between the pin and the torsion arm.

In other embodiments, the torsion arm may comprise a free end portion configured to contact the brake pad and an opposite end portion configured to engage with the torsional mount. The friction fit may be operative between the pin of the torsional mount and a split ring provided at the opposite end portion of the torsion arm.

In various embodiments, the friction fit may be adjustable by a change in at least one of a diameter of the split ring, an inner surface feature of the split ring, an outer surface feature of the pin, a material of the split ring, a material of the pin, a length of the torsion arm, a surface coating at the friction fit and/or a thickness of the split ring.

The torsional mount further may comprise a retainer adapted to avoid inadvertent release of the torsion arm from the torsional mount.

In various embodiments, the system may be configured to retract the brake pad in the range of about 0.001 to about 0.020 inch and the torsional mount may allow rotation of the torsion arm upon a level of force being exerted upon the torsion arm in the range of about 25 pounds to 50 pounds.

In some embodiments, the torsion arm may comprise a free end portion configured to contact a front surface of, the brake pad and an opposite end portion configured to engage with the torsional mount, and/or the engagement of the opposite end portion of the torsional arm with the torsional mount may be such that during the movement of the brake pad by the first distance, the cantilever portion displaces substantially without a rotation of the opposite end portion from a first angular position relative to the torsional mount and/or the engagement of the opposite end portion of the torsion arm with the torsional mount may be such that during the movement of the brake pad beyond the first distance, the opposite end portion may be caused to responsively rotate from the first angular position to a second angular position relative to the torsional mount.

In various embodiments, the engagement of the opposite end portion of the torsional arm with the torsional mount may be configured to impart a resistive torque sufficient to overcome a torqueing action communicated to the engagement through the torsion arm during movement of the brake pad along the first distance and/or the resistive torque may be insufficient to overcome the torqueing action communicated to the engagement through the torsion arm during movement of the brake pad beyond the first distance and/or the torsional mount includes a friction fit to generate the resistive torque. The amount of resistive torque between the torsion arm and the pin may be adjustable by a change in at least one of an inner diameter of the split ring, an inner surface feature of the split ring, an outer surface feature of the pin, a material of the split ring, a material of the pin, a length of the torsion arm, a surface coating and/or a thickness of the split ring.

In embodiments, the split ring may be provided with a closure mechanism, such as with a nut and bolt passing through the split portion of the ring, for adjusting an inner diameter of the split ring, whereby the resistive torque may be adjusted and/or the arrangement to support the pin from a housing portion comprises a plate with a flange, the flange connectable with a second portion of the caliper housing so as to rotationally fix the plate relative to the caliper housing.

Another aspect of the present disclosure provides a brake caliper, comprising a caliper housing comprising opposing side portions disposable on opposite sides of a brake rotor, a brake pad extendably and retractably supported from a side portion of the caliper housing, the brake pad including a braking surface for selectively engaging a side of the brake rotor, a piston operable to extend the brake pad into and out of frictional engagement with the rotor, and, a torsional retractor operative upon the brake pad, with the torsional retractor comprising a torsional mount supported from the caliper housing and a torsion arm supported from the torsional mount such that a first portion of the torsion arm is in contact with a portion of a perspective brake pad and such that a second portion of the torsion arm is supported at an angular relation with respect to the torsional mount, with the torsional mount including a frictional connection in communication with the torsion arm. Upon the piston extending the brake pad along a first distance, the first portion of the torsion arm is displaced and the frictional connection is sufficient to maintain the angular relation between the second portion of the torsion arm and the torsional mount, whereby the torsion arm is flexed, the frictional engagement allowing the first portion of the torsion arm to rotate responsively to the piston further extending the brake pad beyond the first distance, so that upon cessation of the extension force by the piston, the torsion retractor positively retracts the brake pad from the rotor consistently through a wear life of the brake pad.

In embodiments, the torsional retractor may comprise a plurality of torsional retractors at spaced locations about the brake pad and/or the torsional mount may further comprise a releasable retainer operative to retain the torsion arm against inadvertent release from the torsional mount. At least one of a top portion and bottom portion of the housing may include an opening, at least some of the pins being supported from within the housing such that at least some of the torsional retractors may be accessible through the opening.

In some embodiments, the plurality of torsional retractors may be disposed about the brake pad, whereby vibration at the brake pad may be attenuated by the contacts between the plurality of torsional retractors and the brake pad. The plurality of torsional retractors may be disposed symmetrically about the brake pad. In other embodiments, the plurality of torsional retractors may be disposed asymmetrically about the brake pad to accommodate operational differences between different sections of the brake pad.

In various embodiments, the piston may comprise a plurality of pistons and/or the torsional retractors may be arranged in a pattern that counteracts moments imparted by a non-uniform extension of the plurality of pistons during a braking action, whereby the braking surface of the brake pad may engage the rotor more uniformly upon extension of the brake pad by the plurality of pistons.

In some embodiments, the plurality of torsional retractors may contact peripheral portions of the brake pad outside of regions of the brake pad contacted by the plurality of pistons and/or the plurality of pistons act upon a back side of the brake pad and the plurality of torsional retractors contact peripheral portions of the brake pad on a front side of the brake pad.

In further embodiments, the brake pad may comprise mutually opposing first and second brake pads which cooperate with a first torsional retractor and a second torsional retractor, respectively, and/or each of the mutually opposing first and second brake pads may comprise a plurality of brake pads.

In some embodiments, the torsional retractor may apply a hold-off torque against an initial extension of the brake pad by the piston, whereby the torsional retractor momentarily delays the initial extension. In an embodiment, the brake caliper may comprise a plurality of brake calipers, in combination with wheels of an automotive vehicle, wherein at least one of the frictional connection and the first distance of the torsional retractors of different calipers may be selected to create a difference in momentary delays in the operation of their associated brake pads. The momentary delays may be selected to provide a front brake bias to the vehicle and/or the momentary delays may be selected to provide a side brake bias to the vehicle.

A further aspect of the disclosure provides a method of retracting a brake pad of a brake, comprising contacting a portion of a brake pad with an end portion of a torsion arm while supporting the torsion arm with a torsional mount, springing the torsion arm by moving the brake pad a first distance while maintaining the contact and while maintaining an angular relation between the torsional mount and second portion of the torsion arm, accommodating a further movement of the brake pad beyond the first distance by allowing the angular relation between the second portion of the torsion arm and the torsional mount to angularly adjust responsively to the further movement, whereby a positive retraction of the brake pad is obtainable by a release of the sprung torsion arm and whereby the positive retraction is maintainable over a range of brake pad wear by allowing the responsive angular adjustments of the angular relation.

In an embodiment, a frictional connection of the torsional mount may maintain the angular relation during movement of the brake pad a first distance and/or the responsive angular adjustment may include overcoming the frictional connection.

BRIEF DESCRIPTION OF THE DRAWINGS

The forms disclosed herein are illustrated by way of example, and not by way of limitation, in the figures of the accompanying drawings and in which like reference numerals refer to similar elements and in which:

FIG. 2 is a perspective exploded view of a torsional retractor constructed in accordance with the embodiments of the present disclosure and usable in the brake calipers and disc brake assemblies including those shown in FIGS. 1A and 4-7, among others;

FIG. 3 is a perspective view of a torsional retractor assembly of the brake caliper and brake assembly constructed in accordance with embodiments of the present disclosure, including those shown in FIGS. 1 and 4-7, among others;

DETAILED DESCRIPTION

Figure 1A:
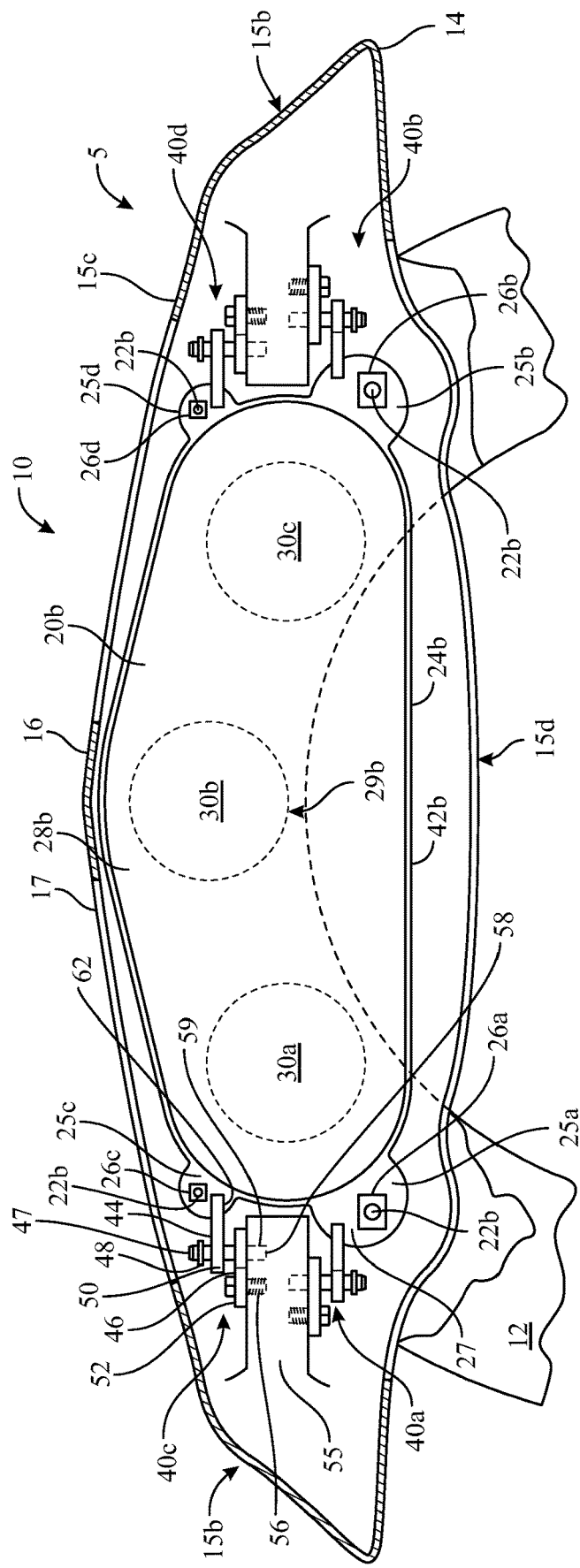
FIG. 1A is a planar cross-sectional side view of a brake caliper of a disc brake assembly which include a set of four torsional retractors, all which are constructed in accordance with an embodiment of the present disclosure.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

Specific forms will now be described further by way of example. While the following examples demonstrate certain forms of the subject matter disclosed herein, they are not to be interpreted as limiting the scope thereof, but rather as contributing to a complete description.

The present disclosure describes a novel brake assembly and caliper having torsional retractors for use in a vehicular disc brake system. The calipers described below are used for illustrative purposes only and it will be understood that this invention may be used in various types of braking systems, with various types of rotors and with various types of vehicles, including race vehicles.

Figure 1B:
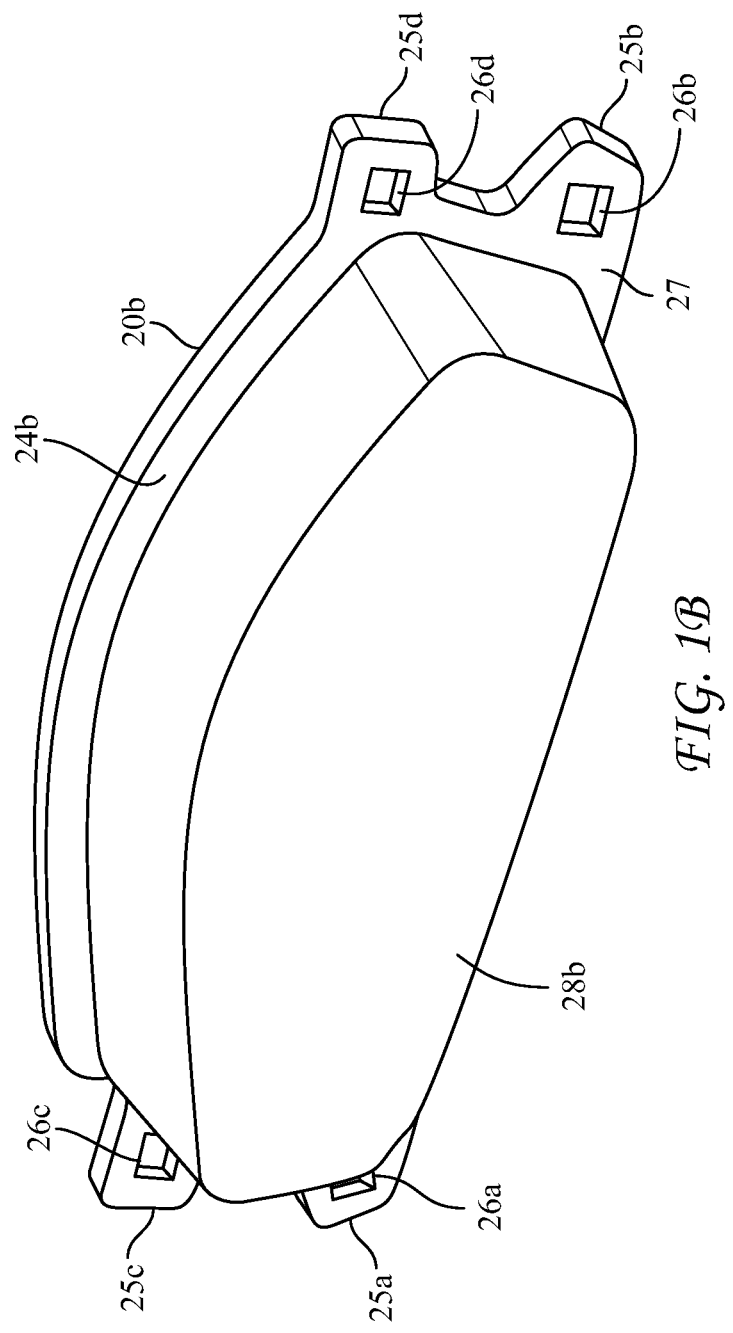
FIG. 1B is a perspective view of a brake pad useable in the brake caliper and disc brake assembly shown in FIG. 1A and in other embodiments.

Referring to FIGS. 1A and 1B, embodiments of the present disclosure provides a brake assembly 5 generally comprising a brake caliper 10 and a rotor 12. The embodiment shown in FIG. 1A provides a brake pad construction and caliper layout which may be more suited for applications in vehicles sold commercially; whereas the embodiments shown in FIGS. 4-7, provides a brake pad construction and a caliper layout which may be more suited to applications in racing vehicles and other high performance vehicles. The teachings herein will begin with description of the first embodiment shown in FIG. 1A, which will be followed by a description of the embodiments shown in FIGS. 4-7.

Figure 4:
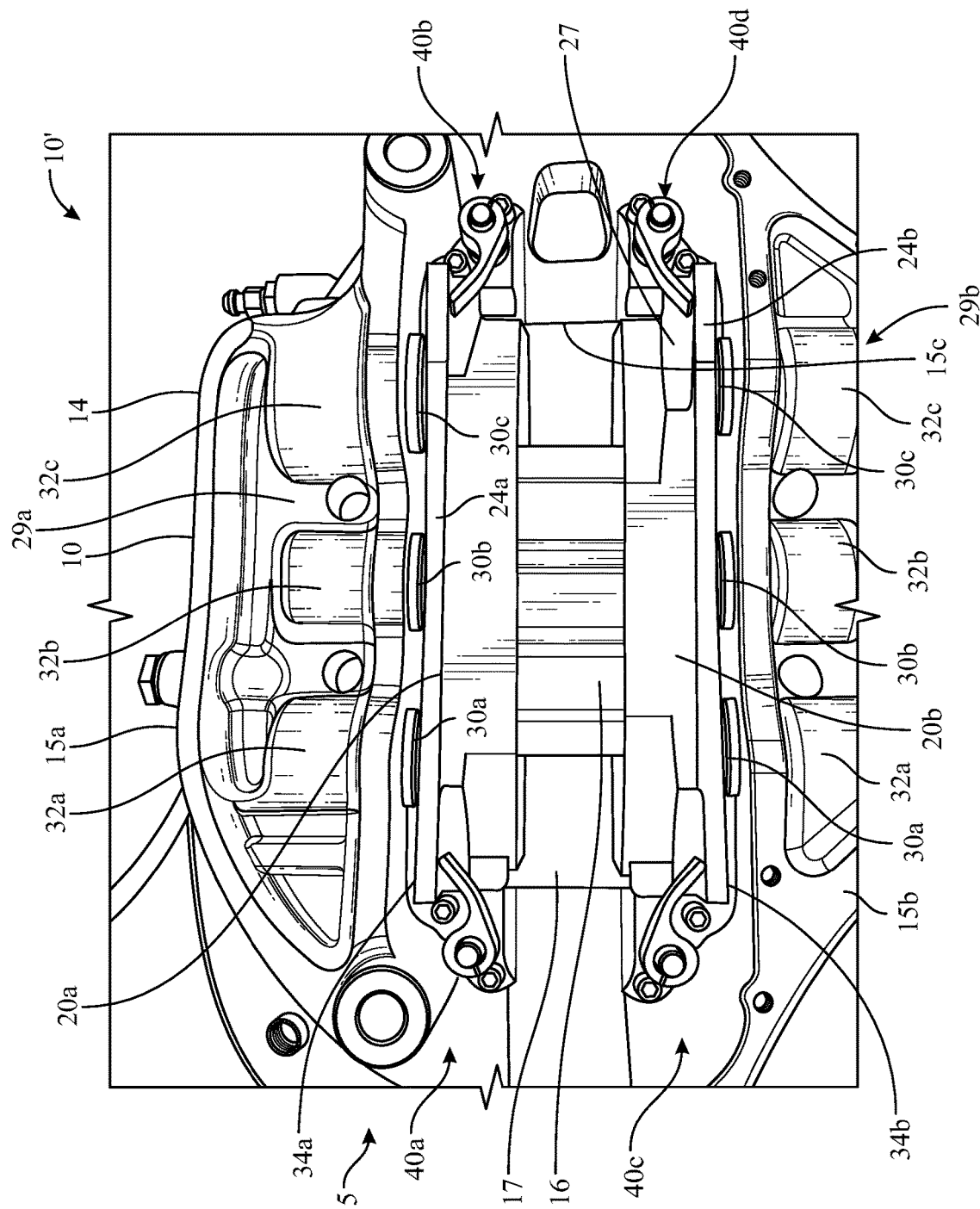
FIG. 4 is a bottom view of a brake caliper suitable for use in a high performance vehicle and which is provided with a set of torsional retractors constructed in accordance with an embodiment of the present disclosure.

Referring now to FIG. 1A, the brake caliper 10 may comprise a caliper housing body (caliper housing) 14 which may include a front side section 15a (not shown in FIG. 1A, but see FIG. 4), a back (rear) side section 15b and an upper housing section 15c. It is to be understood that the description which follows pertains to features associated with the back housing section 15b and that the features associated with the front housing section 15a may be arranged in like manner, but disposed adjacent an opposite side of the rotor 12. It is also to be understood that portions of the rotor 12 would extend across the brake pad 20b of the back housing section 15b, and is only partially shown in FIG. 1A for sake of clarity. The front and back brake pads 20a. 20b may be disposed adjacent opposite sides of the rotor 12, in a mutually opposing relation such as shown in FIG. 4.

Referring back to FIG. 1, in some embodiments, the upper housing section 15c may include a removable bridge 16 and an opening 17 of sufficient size to permit facile insertion and withdrawal of a pair of brake pads 20a, 20b into and from the housing sections 15a,b, respectively upon removal of the bridge 16. In other embodiments, the bridge 16 may comprise an integrated section of the housing body 14 and in other embodiments, there may be an absence of a bridge 16. Pairs of removable pad support pins 22a, 22b may be extended from lower and upper regions of the front and back housing sections 15a, 15b, respectively, to provide guidance and support for the brake pads 20a, 20b.

The bridge 16 may provide support for a wear sensor, and/or it may serve as a guide rail for a claw (not shown) which may be provided atop the backing plate 24a, 24b of each brake pad 20a, 20b, respectively.

Referring now also to FIG. 1B, in some embodiments, each brake pad 20a, 20b may include one or more tabs 25a-d that may extend laterally from lower and upper corner regions of the respective backing plate 24a, 24b. The tabs 25a-d may include apertures 26a-d, respectively, that may be sized to slidingly receive the support pins 22a,b that may extend from each side section 15a, 15b of the caliper housing body 14. Each brake pad 20a,b may further comprise a body of friction material 28a, 28b that is carried on the backing plate 24a,b, respectively.

Referring back to FIG. 1A, during a braking operation, the pair of opposing brake pads 20a, 20b are urged toward each other by one or more piston arrays 29a, 29b, respectively, whereupon the bodies of friction material 28a, 28b frictionally engage opposite sides of a rotor disc 12 to effect a braking action upon a vehicle.

Still referring to FIG. 1A, in some embodiments, each side housing section 15a, 15b may provide support for an array of pistons, with a first piston array 29a being disposed along a front frame member 15a of the caliper body 14 and a second array 29b being disposed along a rear frame member 15b of the caliper body 14. In the presently disclosed embodiments, the side frame sections 15a, 15b are fixed, and the array of pistons 29a and 29b may be mutually opposed and arrayed in mirror images of each other; and each piston array 29a, 29b may comprise a first second and third piston 30a-c, which are mutually arranged such that the second piston 3b may be displaced radially inside (or outside) of the locations of the other pistons 30a and 30c. In other embodiments, the number of pistons may differ and their mutual arrangement may be configured otherwise. For example, they may all be arcuately aligned in a circumferential row or differ in number (greater and fewer) and may comprise only a single piston 30. The pistons 30a-c may also differ in size from one another or be the same size. Also, in the case of a floating caliper, there may be only one piston array 29.

Still referring to FIG. 1A, in some embodiments, each piston 30a-c may comprise a piston body which is slidingly movable along the walls of a cylinder 32a-c, respectively, located in a side housing section 15a,b of the caliper housing body 14. Brake fluid may be communicated to each of the cylinders 32a-c through internal channels within the caliper housing body 14, which may include a crossover channel that may provide communication of brake fluid from one side of the caliper housing body 14 to the other (usually from the back housing section 15b to the front housing section 15a). An inlet port may be provided on the back housing section 15b of the caliper housing body 14 for communicating the internal channels within the housing body 14 with brake lines and other components of a vehicle brake system. In some embodiments, at least some of the internal channels may be external instead being internal and may be routed in a manner other than what is specifically described herein.

Upon application brake pedal pressure, fluid pressure may be communicated to the cylinders 32a-c of each piston array 29a,b to cause their piston faces to be urged against a backside of the backing plates 24a,b of each brake pad 20a,b, respectively.

It should be noted that hydraulic pistons 30a-c are only one example of reacting members which may be used to extend and retract the brake pads 20a,b with respect to the rotor 12. Alternatively, the brake pads 20a,b may be extended and retracted by an air actuated piston, by a mechanical arrangement of cams and levers, or electrically via solenoids for example. The term "brake piston" as used herein, is intended to include all such mechanism and their equivalents and is not limited to the disclosed examples.

Referring now to FIGS. 1A and 2, in the disclosed embodiment and others, the brake assembly 5 further comprises a plurality of brake pad torsional retractors 40a-d that may be disposed about the peripheries 42a,b of the brake pads 20a,b, respectively, and which are configured and arranged to positively retract each of the brake pads 20a,b upon release of pressure within the piston cylinders 32a-c, which in the usual circumstance, is predicated upon the operator of the motor vehicle releasing pressure on the brake pedal of the vehicular brake system.

In the illustrated embodiments of FIG. 1A and others, each of torsional retractors 40a-d may correspond (be duplicative) with one another and may differ only in that they are disposed within one of the housing side sections 15a, 15b or the other. However, it is also contemplated, that the plurality of torsional retractors 40a-d may differ from one another and their placement, size and/or mechanical features may differ from what is specifically described with respect to the illustrated embodiments.

However, for purposes of facilitating their description, reference will now be made to the plurality of torsional retractors 40a-d that may be disposed within the back side housing portion 15b as shown in FIG. 1A, with the understanding that the teachings herein may be applied to the aspects and details of the torsional retractors 40a-d disposed within the front side housing section 15a and to the torsional retractors 40a,b of the embodiments illustrated in FIGS. 4-7.

Referring now specifically to FIGS. 1A, 2 and 3, in various embodiments, the torsional retractor 40 may comprise a torsion arm 44 and a torsional mount 46. The torsion mount 46 may be configured to be securable within (or without) the caliper housing 14 and may include a pin 47 for torsionally supporting the torsion arm 44 such that the torsion arm 44 may extend laterally of the pin 47 and such that upon application of prescribed range of force upon a location along the torsion arm 44, the torsion arm 44 will rotate relative to the pin but not before.

In embodiments, the torsional mount 46 may further comprise a flanged plate 52 whose flange 53 includes an aperture 54 for receiving a fastening bolt 56 that may be threaded into an adjacent portion of the caliper housing body 14 such as a flange 55 within the side housing section 15b. The torsional mount 46 may further comprise a seating pin 58 which may be configured to be insertable into a bore 59 provided in caliper housing body 14 (such as at the flange 55 of the caliper housing body 14). By such arrangement, the torsional mount 46 locates the pin 47 at a desired location relative to the brake pad 20b in a manner which resists if not wholly prevents rotation and/or lateral displacement of the pin 47 during operation of the retractor 40. In addition or in lieu of the seating pin 58, the torsional mount may be provided with a second flange and aperture for establishing a second bolted connection of the torsional mount 46 to the caliper housing body 14 and/or the seating pin 58 may be located on a second flange and/or at a location along the first flange 53. Other suitable arrangements may be configured and employed to fixedly locate the pin 47 to the caliper housing body 14 at a desired relation to a mounted, brake pad 20.

In various embodiments, the seating pin 58 may be an extension of the pin 47 and/or the seating pin 58, the pin 47, and the flanged plate 52 may all be constructed as a single integrated unit so as to a assure rigidity and strength when the torsional mount 46 is secured to the housing body 14.

In the illustrated embodiments and others, the pin 58 may seat within the bore 59 of the housing body with a close running slip fit, which may include a clearance of about 0.001 to about 0.002 inch. Such arrangement facilitates achievement of requisite rigidity in the torsional mount 46, but with an acceptable ease of removal for replacement and/or servicing of the corresponding retractor 40.

In embodiments, the torsional mounts 46 are configured to orient the longitudinal axis 61 of the pins 47 in a generally vertical direction, which orientation may be toward either the upper housing section 15c and/or the lower housing section 15d. The latter arrangement provides access to the retractors from beneath the caliper housing 14. In various further embodiments, the orientation of the pins 47 may be other than vertical.

The torsional mounts 46 may be located proximate to but laterally of the outer periphery (perimeter) 42b of the brake pad 20b such that brake pad 20b may be extended and retracted without interference between the brake pad 20b and the torsional mount 46. In some applications the lateral extent of the torsion arm 44 (from the axis 61 of the pin 47 to the tip 60 of the torsion arm 44) may be in the range of about 0.75 inch to about 1.5 inch for smaller calipers or greater for larger vehicles and larger calipers. A nominal length may be approximately 1 inch.

In the embodiment shown in FIG. 1A, the respective torsional mounts 46 of the retractors 40a-d are positioned such that a tip 60 at the free end portion 62 of each torsion arm 44 may be brought into contact with a front-facing surface 27 of a respective tab 25a-d of the backing plate 24. It is contemplated that the retractors 40 may be implemented in contact with other frontal portions of the brake pad 20b and/or be deployed at different locations and/or in different numbers (including only a single retractor 40) other than what is specifically shown in FIG. 1A.

Referring back to FIGS. 2 and 3, in various embodiments, the torsion arm 44 may include a split ring portion 50 whose inner diameter is selected such that a preselected degree of friction fit (press fit) may be established between the pin 47 and the split ring portion 50 of the torsion arm 44. A desired degree of press fit may require a predetermined amount of force in the range of about 25 to about 50 pounds to be applied upon the tip 60 of the torsion arm 44 in order for the press fit to be overcome and for the torsion arm 44 to rotate relative to the pin 47. An application of force at the tip 60 less than the predetermined amount of force may be insufficient to overcome the press fit and in such event, the press fit which would continue to hold the torsion arm 44 steadfast without rotation relative to the pin 47. A nominal preselected amount of force may be approximately 35 pounds of force.

In various embodiments, an interference in the range of about 0.001 inch and about 0.002 inch between the pin 47 and the torsion arm 44 may suffice to establish a desired level of resistance to rotation at the connection between the pin 47 and the torsion arm 44.

In embodiments, the pin 47 (and the entirety of the torsional mount 46, if unitary) may be constructed from a chromium-molybdenum steel and the torsion arm 44 may be constructed from a stainless steel, the latter being a preferred material for its resistance to heat transfer from a deployed brake pad 20 to the corresponding retractor 40 and adjacent portions of the caliper housing 14. The minimal contact between the tip 60 of the torsion arm 44 and the front facing surface 27 of the backing plate 24 also minimizes the transfer of heat from the deployed brake pad 20 to the corresponding retractor 40 and adjacent portions of the caliper housing 14.

In embodiments, the torsion arm 44 may be provided with a thin diamond like carbon coating, whose thickness may be in the range of about 0.0002 to about 0.0003 inch or more. The coating may be included to prevent galling of the stainless steel surfaces of the split ring 50 when the torsion arm 44 is caused to rotate pivot) relative to the pin 47. In addition, the hard coating minimizes wear upon the tip of the torsion arm during movement of a brake pad 20. Additionally, the torsional mount pin can be provided with a nitrided surface to help prevent scoring.

Each retractor 40 may further comprise an arrangement to safeguard against unintended release of components of the retractor 40 upon roadways (such as the torsion arm 44). The arrangement may comprise a removable lock ring 48 that may be engageable with a free end portion of the pin 47 (as shown in FIG. 3). Other well-known locking arrangements may be used instead such as insertable pins, pin clips and other removable locks.

The tips 60 of the torsional retractors 40a-d may be provided with a rounded surface so that should any sliding occur between tip 60 of the torsion arm 44 and a surface 27 of any of the tabs 25a-d, scarring (scratching) of the latter is minimized if not wholly avoided. The contour of the tip 60 may be configured to create a narrow line of contact with a front facing surface 27 of the brake pad, which for the embodiment shown in FIG. 1A, may be the front facing surface 27 of the tabs 25a-d.

Referring particularly to FIGS. 2 and 3, in some embodiments, the torsion arm 44 may comprise a first arm section 63, which may extend tangentially from the split ring portion 50 and a trailing arms section 66, which may extend rearwardly (toward a retracted brake pad) from the first arm section 63, such that torsion arm 44 may extend about adjacent edges of the caliper housing body 14 and/or edges of other brake components.

The pin 47 of the torsional mount 46 and the split ring portion 50 of the torsion arm 44 are mutually configured such that the torsion arm 44 may be sprung (flexed) by a certain amount (such as by a displacement of the tip 60 by a distance D) before the friction fit is overcome and releases, which flexing may correspond to a desired amount of retraction D to be obtained from action of the torsion retractor 40. During such initial flexing of the torsion arm 44, the friction fit remains steadfast to maintain the angular orientation of the split ring portion 50 of the torsion arm 44 with respect to the pin 47. In embodiments, the friction fit may wholly prevent any rotation of the split ring portion 50 during the initial flexing of the portion arm 44.

In constructing a particular retractor, one may select a desired range of retraction (the distance D) to be achieved by the subject retractor 40 and a desired range of retraction force to be imparted by the torsion arm 44 at time of brake release and configuring the torsion arm 44 such that upon it being flexed by the distance D, it exerts a retraction (flexed) force in the range of the desired range of retraction force. Solely for sake of example, the distance D may be in the range of about 0.012 to about 0.018 inch and the desired retraction force may be in the range of about 33 about 37 pounds (which, with the 1 inch long torsion arm 44, is a desired retraction torque of about 33 inch pounds to about 37 inch pounds).

It is contemplated that the spring rate (flexibility) of the torsion arm 44 might be selectively adjusted by any of the following: changing the thickness of the torsion arm; by changing the length of the torsion arm; by weakening the torsion arm with one or more slots or regions of perforations or the like; by changing the material of the torsion arm; and/or by interposing a spring between the torsion arm and the split sleeve and changing the spring from one of a given spring rate to another spring having a different spring rate.

Figure 8A:
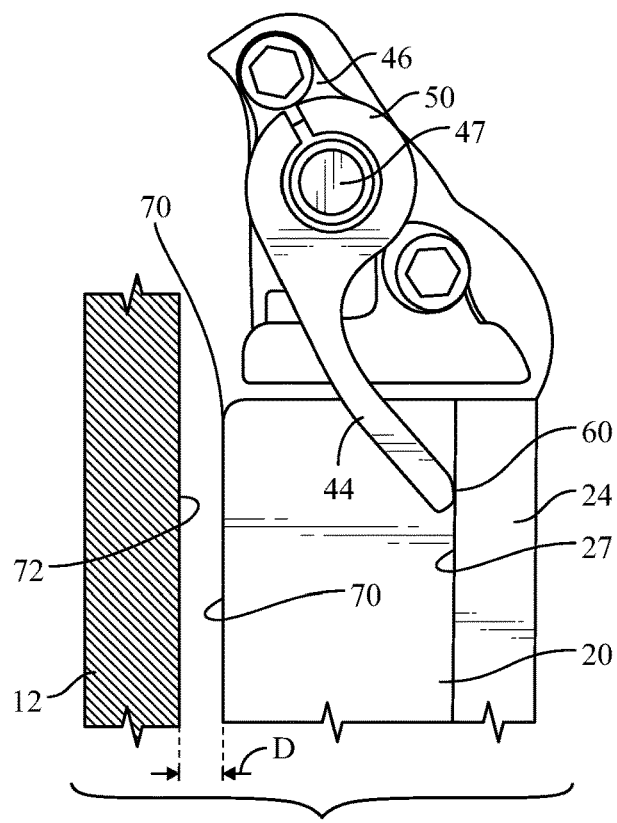
FIG. 8A is a schematic detail end view of the torsional retractor and a portion of a corresponding brake pad as shown in FIG. 1A with the corresponding brake pad having been retracted to a first retracted position, in accordance with an embodiment.

Referring now to FIG. 8A, in an original unsprung (retracted) state, the torsion arm 44 is in contact with an adjacent portion of the backing plate of the brake pad 20 such that the leading (frictional) surface 70 of the brake pad 20 is retracted by a selectable distance D from the opposing face 72 of the rotor 14. In this retracted position, the torsion arm 44 may exert approximately 5 pounds of force upon the brake pad 20 away from the rotor 12, which action may attenuate vibration and/or rattles at or about the brake assembly 10 such as at the pistons or other sources.

Figure 8B:
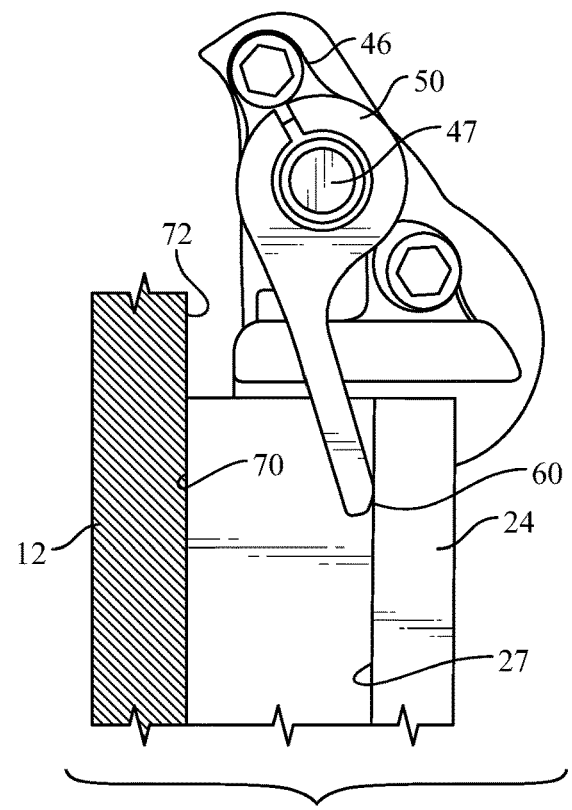
FIG. 8B is a schematic detail end view of the torsional retractor and a portion of a corresponding brake pad as shown in FIG. 1A with the corresponding brake pad having been extended to a first extended position against a rotor, in accordance with an embodiment.

In embodiments, the distance D may be in the range of about 0.001 to 0.020 inch or may be selected to be nominally about 0.0150 inch. Selecting a distance D of greater proportion is possible but tend to create undesirable (soft/delayed) sensations at the brake pedal when the brake pedal is first depressed. Referring now to FIG. 8B, upon actuation of the brake system by the operator of the motor vehicle depressing a brake pedal of the vehicle brake system, one or more of the pistons 30 will extend the brake pad 20 toward the rotor 12, which action will displace the tip 60 of the torsion arm 44 by the aforementioned distance D, causing the torsion arm to flex, but without any cognizable rotation (pivoting) of the split ring 50 of the torsion arm 44 relative to the pin 47 of the torsional mount 46.

Figure 8C:
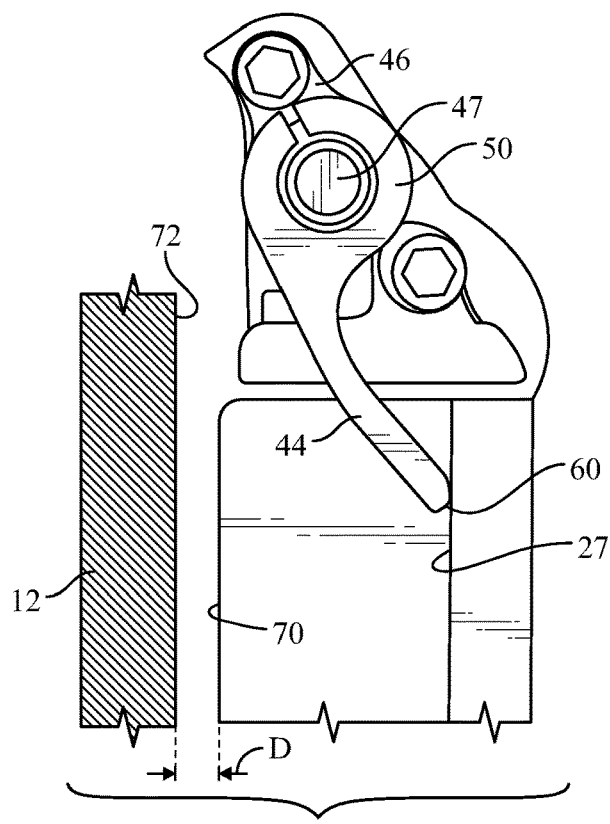
FIG. 8C is a schematic detail end view of the torsional retractor and a portion of a corresponding brake pad as shown in FIG. 1A with the corresponding brake pad having been again retracted and returned to the first retracted position, in accordance with an embodiment.

Referring now to FIG. 8C, without an occurrence of wear at either the leading surface 70 of the brake pad 20 or at the opposing surface 72 of the rotor 12 and upon release of pressure on the brake pedal by the operator of the motor vehicle, the extending action of the piston(s) 30 is relaxed and the torsion arm is allowed to return to its unflexed (unsprung) condition such that leading face 70 of the brake pad 20 is again spaced by a distance D from the opposing face 72 of the rotor 12.

Figure 8D:
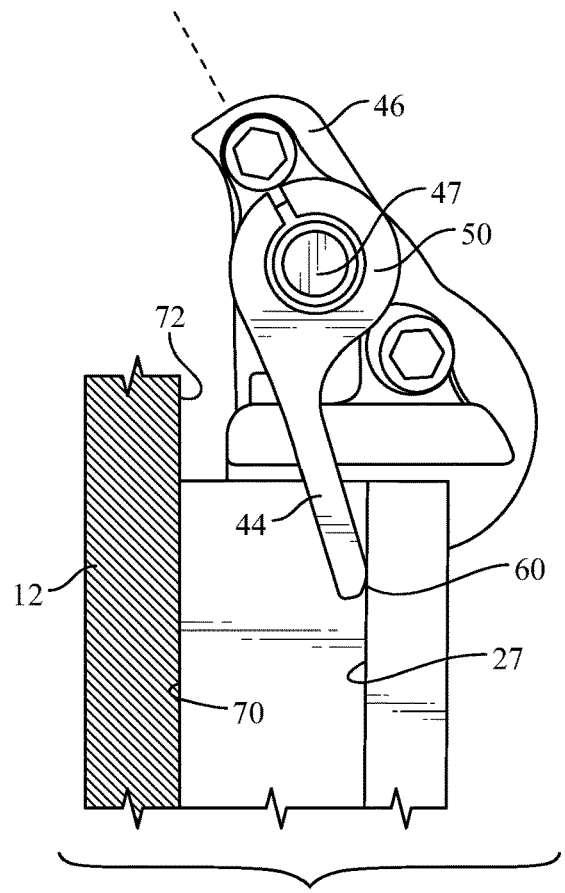
FIG. 8D is a schematic detail end view of the torsional retractor and a portion of a corresponding brake pad as shown in FIG. 1A with the corresponding brake pad having been again extended to the first extended position, in accordance with an embodiment.

Referring now to FIG. 8D, when the operator of the motor vehicle again depresses the brake, one or more of the pistons 30 will again extend the brake pad 20 toward the rotor 12, which action will again displace the tip 60 of the torsion arm 44, causing the torsion arm to flex, but without cognizable rotation of the split ring 50 of the torsion arm 44 relative to the pin 47 of the torsional mount 46.

Figure 8E:
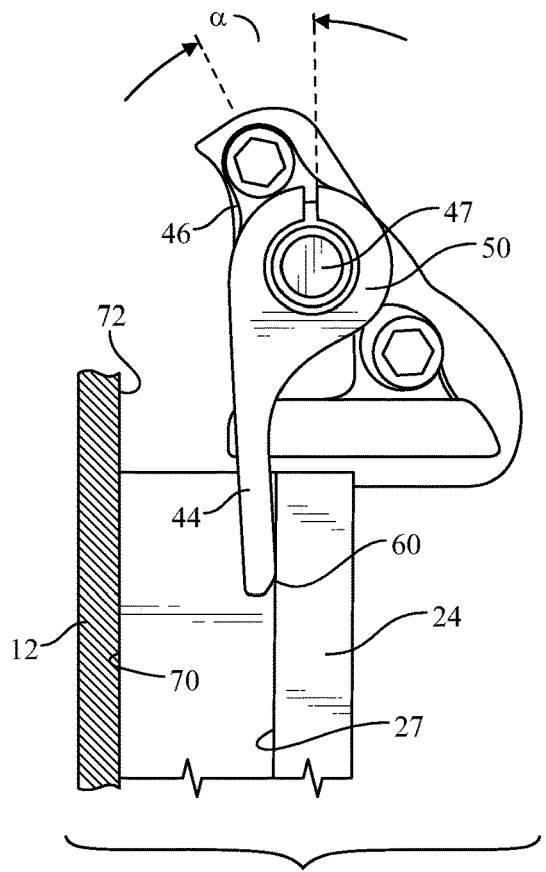
FIG. 8E is a schematic detail end view of the torsional retractor and a portion of a corresponding brake pad as shown in FIG. 1A with the corresponding brake pad having been extended beyond the first extended position as a result of wear of the pad and/or rotor, in accordance with an embodiment.
Figure 8F:
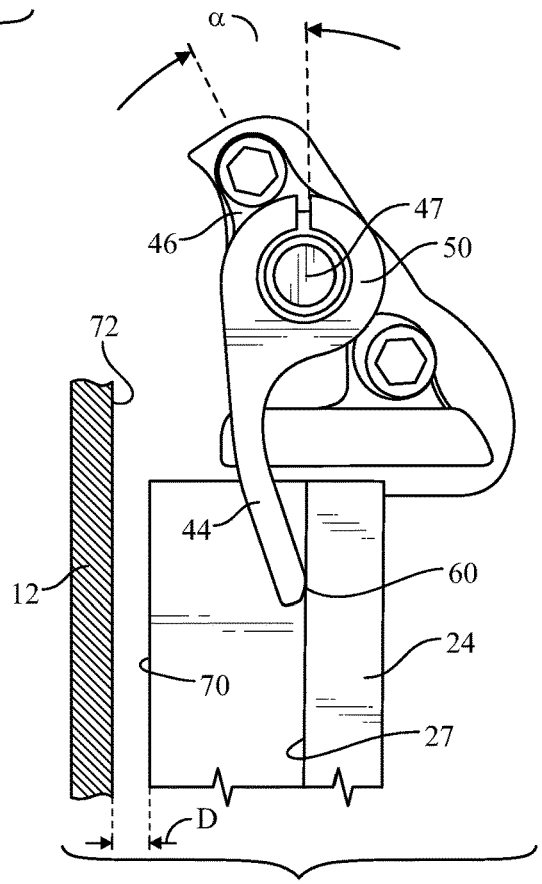
FIG. 8F is a schematic detail end view of the torsional retractor and a portion of a corresponding brake pad as shown in FIG. 1A with the corresponding brake pad having been again retracted but from the further extended position shown in FIG. 8E, in accordance with an embodiment.

Referring now to FIG. 6E, upon repeated application of the brakes during operation of the motor vehicle, the leading surface 70 of the brake pad 20 and/or the opposing surface 72 of the rotor 12 begin to wear, and the frictional material 28 of the brake pad 20 and/or the rotor 12 become thinner such that the pistons 30 must extend the brake pad 20 (together with the tip 60 of the torsion arm 44) ever further than the original distance D to maintain braking action. The resultant further extension of the tip 60 of the torsion arm 44 causes an increase in torsional action about the pin 47 sufficient to overcome the torsional friction fit between the split ring 50 of the torsion arm and the pin 47 of the torsional mount 46, such that the split ring 50 of the torsion arm 44 is caused to rotate (pivot) about the pin 47 by an angle alpha ($\alpha$). It is to be understood that the torsion arm 44 remains flexed to the same or essentially the same degree (the distance D) that it was flexed as shown in FIGS. 8B and 8D. Accordingly, even at a further extended position such as shown in FIG. 8E (or even at a lesser or greater extension), the spring action of the torsion arm 44 will retract the brake pad 20 by a distance D upon release of pressure on the brake pedal by the operator of the motor vehicle.

Accordingly, throughout the wear life of the brake pad 20 and the rotor 12, a positive retraction of the brake pad is assured, which action avoids contact between the brake pad and the rotor between braking operations and avoids parasitic losses in performance of the vehicle and/or its consumption of fuel that might otherwise occur.

Additionally, the disclosed brake system 5 facilitates a speedy and effective replacement of brake pads and a speedy and effective resetting of the retractors without imposing burdensome, time-consuming steps, which would otherwise burden commercial service providers of commercially available vehicles and ground crews of race vehicles. When brake service is needed, the retractors may be readily removed from the caliper housing body 14 and may need not be disassembled to access and service the brake pads. Their removal from the caliper housing body 14 is simplified by the bolted connection and pin. Furthermore, no threading of elements into and out of the backing plate is required. Because the torsion arms may merely contact surface portions of the backing plates of the brake pads and are not fastened thereto, the retractors may cooperate with brake pads constructed from composite materials which do not lend themselves readily to tapping or other forms of forming threaded bores.

Furthermore, the positioning of the retractors 40 about the brake pads 20, the length and material of the torsion arms 44 and friction fit between the torsion arms 44 and the pins 47 may be configured/selected such that vibration during braking operations (and rattling between braking actions) are attenuated. The torsional retractors may be provided with resilient washers and the like to further attenuate unwanted vibrations and rattles. For example, resilient washers may be interposed between the caliper housing body 14 and the flange 52 and/or the seating pin 58 on some or each torsional mount 46 of the retractors 40.

In addition, the retractors 40 may be placed at locations about the respective brake pad 20, such that the torsion arms 44 of the retractors 40 impart biasing actions about the brake pads such that the uniformity (evenness) of the extending action of the piston(s) 30 upon brake pad is enhanced.

Replacing Brake Pads

Installation of a new brake pad 20*a* may be facilitated by disconnecting the torsional mount 46 from the caliper housing body 14 and withdrawing torsional mount 46 together with the torsional arm 44 from the housing 14. While withdrawn, the angular relation between torsion arm 44 and the pin 47 may be reset to correspond with the nominal angular relation specified for a fresh brake pad 20. Upon replacement of a worn brake pad with a fresh brake pad 20 in the caliper housing body 14, the reset retractors 40 may be reinstalled into the caliper housing body 14. The retractors 40 may be conveniently withdrawn from the housing body 14 through openings provided in either the upper housing section 15*c* or the lower housing section 15*d* without interference from the free end portions 62 of the torsion arms 44. Upon placement of a fresh brake pad 20*a*, the torsion arm 44 may be rotated back in the general direction of the arrow 67 in FIG. 6 if necessary, until such time the tip 60 of the torsion arm 44 contacts an adjacent portion of the back plate 24*a*. The described rotation to and fro (arrows 65 and 67 in FIG. 6) requires the operator to overcome the friction fit between the pin 47 of the torsional mount 46 and the split ring portion 50 of the torsion arm 44, either manually or with a tool assisted action.

Calipers for High Performance (Race) Vehicles

Figure 5:
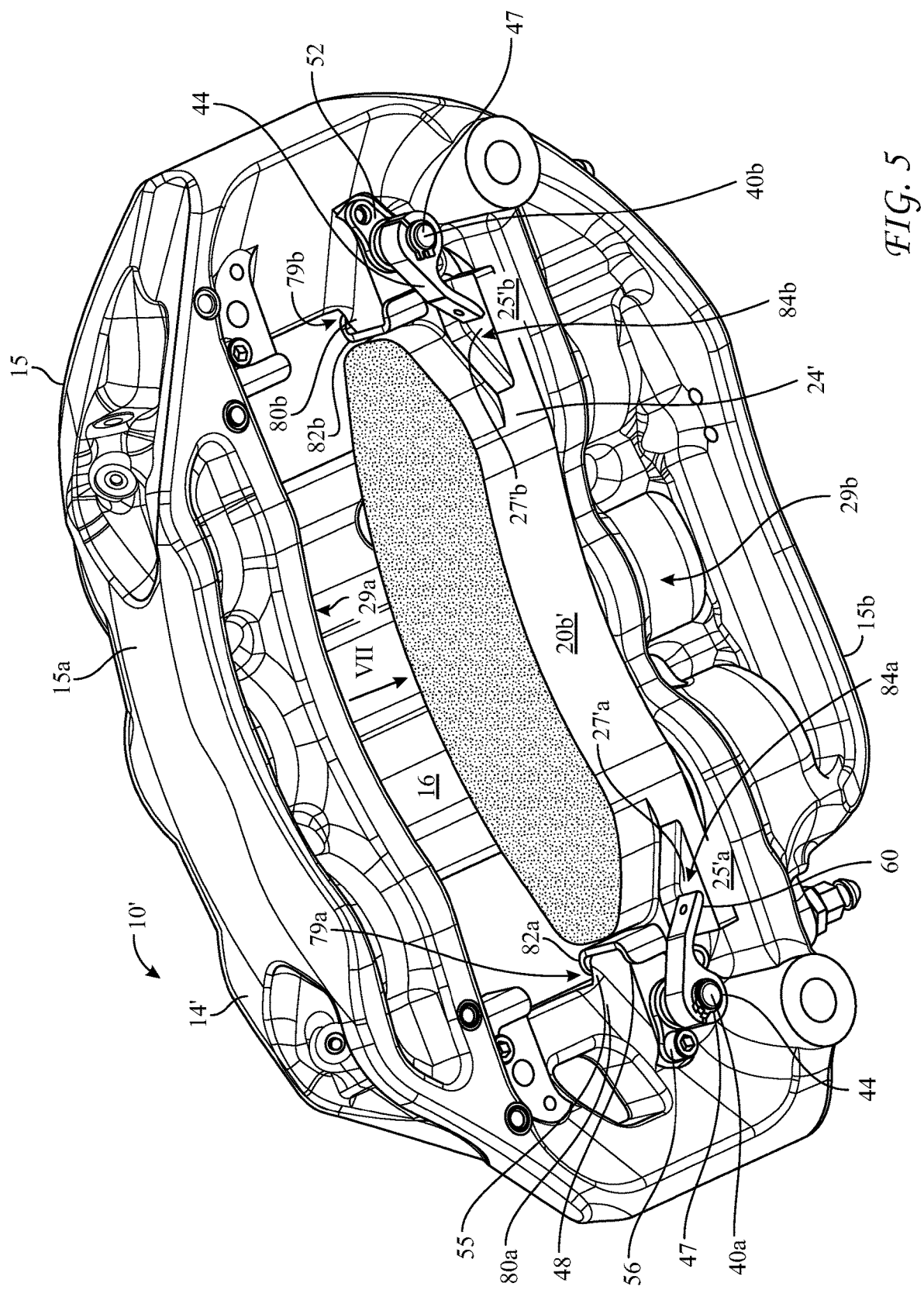
FIG. 5 is a perspective bottom view of the brake caliper shown in FIG. 4, but with one of the brake pads mounted within the brake caliper housing, in accordance with an embodiment.
Figure 10:
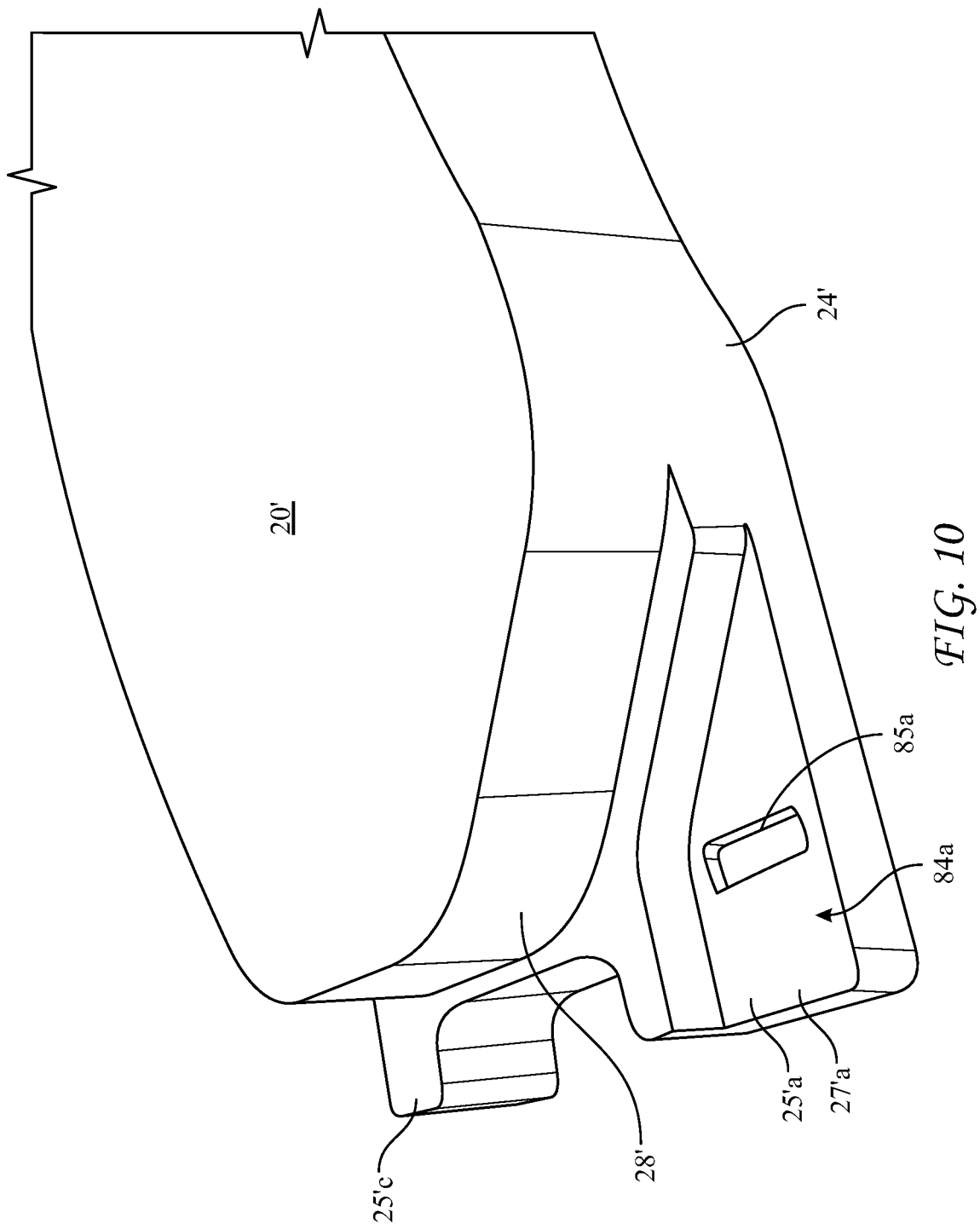
FIG. 10 is a perspective detail of an end portion of a monolithic, carbon-based brake pad constructed in accordance with embodiments of the present disclosure and suitable for use in the brake calipers shown in FIGS. 1 and 4-7 and other embodiments thereof.
Figure 11:
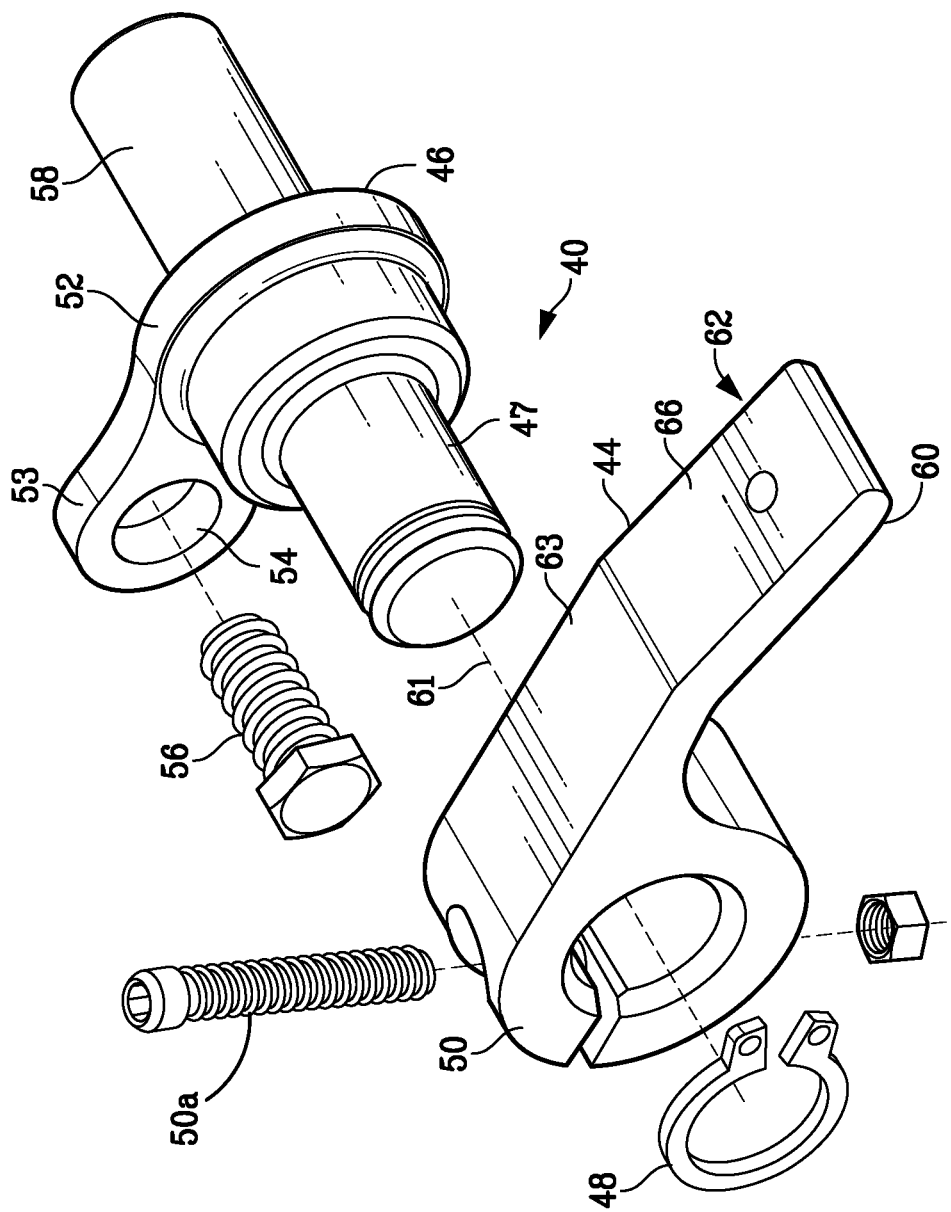
FIG. 11 is a perspective view of an alternate embodiment of a torsional retractor assembly.

Referring now to FIGS. 5 and 10, another embodiment of the present disclosure provides a brake system 10' which may be particularly suited for applications in race vehicles and other high performance vehicles. The brake system 10' may include a monolithic brake pad 20' and a housing body 14' which is highly arcuate and compact so as to minimize weight and accommodate the smaller size of wheels of some race cars. For example, permissible wheel rim diameter for some race cars may be set at 13 inches. The housing body 14' of the brake system 10' may be provided with a pair of stop-guides 79*a,b* which are located adjacent and engage with end portions of the monolithic brake pad 20'. The brake system 10' may further comprise a pair of retractors 40*a*, 40*b* which cooperate with a monolithic brake pad structure 20'. The description which follows is generally directed with reference to one side of the caliper housing 15, that being its back side portion 15*b*, with it being readily understood that the opposite (front) side portion 15*a* would be constructed similarly.

Referring now also to FIG. 10, in various embodiments, the monolithic brake pad 20' may comprise, as a single unitary structure, a friction body 28' and a backing plate 24' which may include tabs 25'*a-d*. The monolithic brake pad 20' may be constructed of a carbon matrix, a carbon fiber matrix or a carbon metallic matrix or other suitable friction-brake material having a capacity to withstand extreme temperatures such as 2000° F. A rear portion of the monolithic brake pad 20' may be configured and arranged to serve as the backing plate 24', including its tabs 25'*a-d*, wherein the backing plate 24' is configured to receive piston action from the piston array 29*b* and the tabs 25'*a-b* may provide support and/or guidance during movement of the monolithic brake pad 20' toward and away from a rotor 12 upon actuations of the piston array 29*b*. For example, in the illustrated embodiment, the tabs 25'*a* and 25'*c* at one end of the brake pad 20' may interdigitate (register) with surfaces of the stop-guide 79*a* of the caliper housing 14. Likewise at the opposite end of the brake pad 20', the tabs 25*b*' and 25'*d* may register with surfaces of the stop-guide 79*b*. In various embodiments, the stop-guides 79*a,b* may each comprise a stop-guide support 80*a,b* and a metallic stop-guide plate 82*a,b* attached thereto. During braking action, the stop-guides 79*a,b* guide the movement of the brake pad 20' into and away from engagement with the rotor 12 and limit circumferential displacement of the brake pad 20' during braking action against the rotor 12.

In the embodiments illustrated in FIGS. 5-7, the respective torsional mounts 46 of the retractors 40*a,b* may be secured to the stop/guide supports 80*a,b*, respectively, using the bolts 56 and pins 58 as previously described with reference to embodiments shown in FIGS. 1-3. The torsion arms 44 may be positioned upon the pins 47 such that the tip 60 at the free end portion 62 of each torsion arm 44 may be brought into contact with a front-facing surfaces 27'*a,b* of the tabs 25*a'*, 25*b'*, respectively, of the of backing side 24'.

Figure 6:
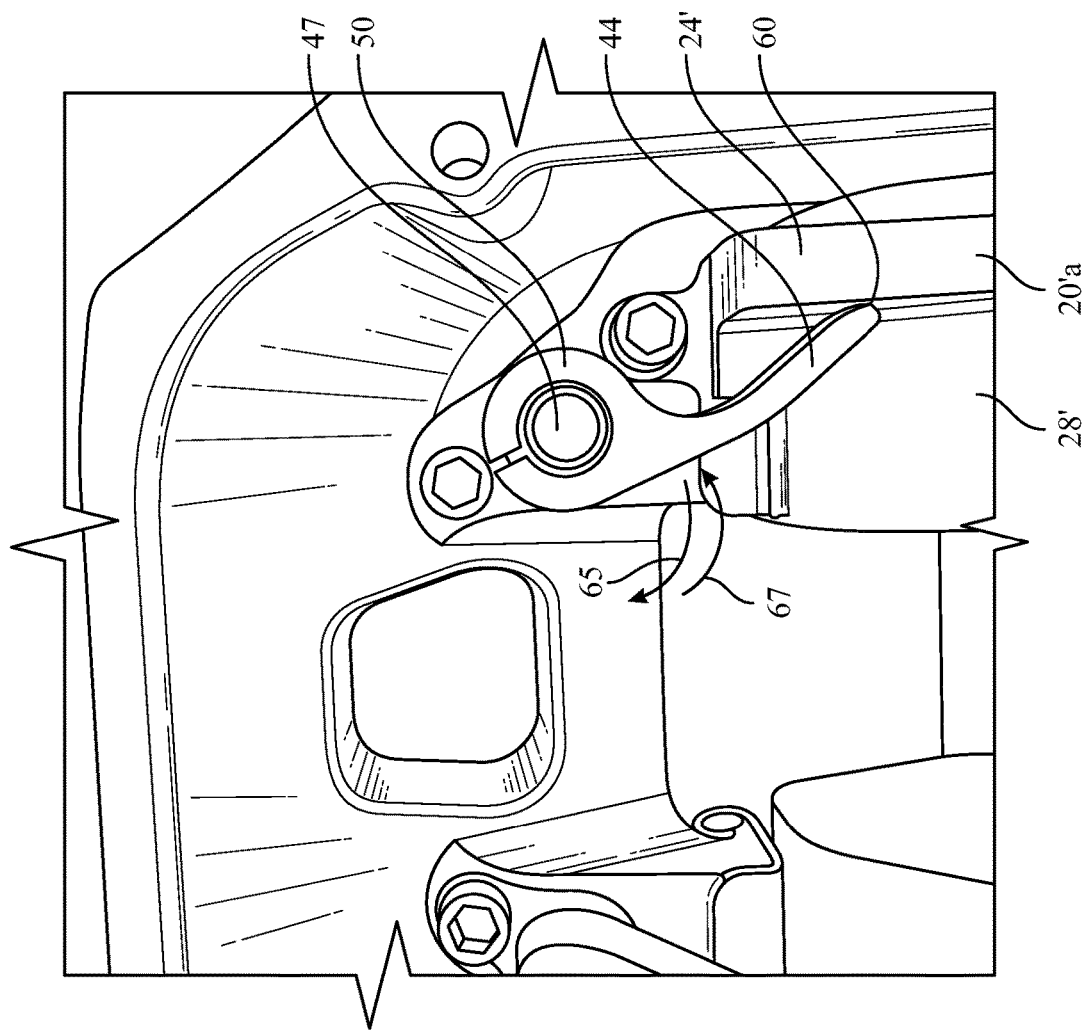
FIG. 6 is a detail end view of one of the torsional retractors of the brake caliper shown in FIGS. 4 and 5, in accordance with an embodiment.
Figure 7:
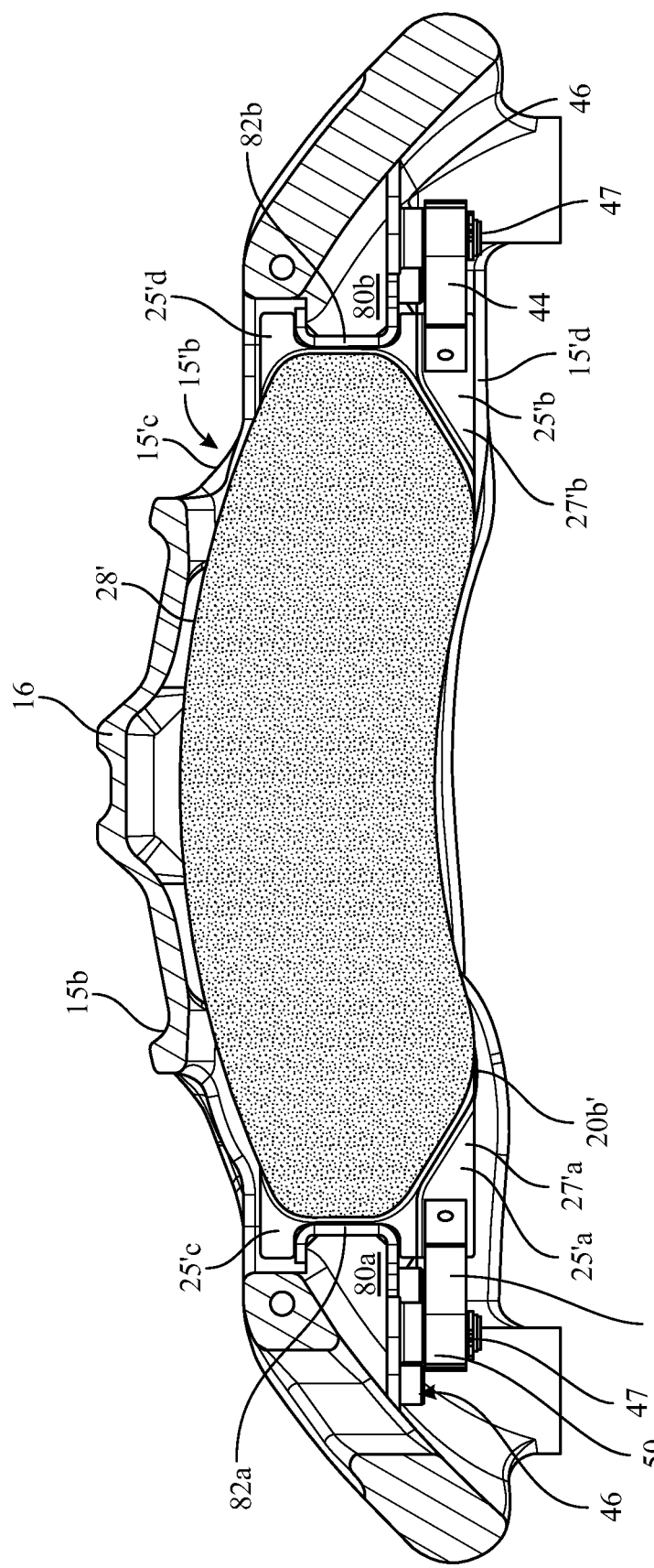
FIG. 7 is a cross-sectional planar side view of the brake caliper shown in FIG. 5 as viewed in the direction of arrow VII in FIG. 5, in accordance with an embodiment.

In the embodiments illustrated in FIGS. 5-7, the front-facing surfaces 27'*a,b* of the lower tabs 25'*a,b* may be located in recesses 84*a,b* in the tabs 25*a'*, 25*b'*, respectively. The depth of the recesses 84*a,b* may be selected such that contact between surfaces of the torsion arms 44 and the rotor 12 is avoided throughout the useful life of the brake pad 20'.

Referring now also to FIG. 10, optionally, a second vertically extending recess (notch) 85*a,b* may be provided in the front-facing surfaces 27'*a,b* of the tabs 25*a'* and 25*b'*, respectively, to provide further clearance between the torsion arms 40 and the rotor 12 when the brake pad 20' is at the end of its useful life and/or to register where the end portions 62 of the torsion arms 44 are to contact the front-facing surfaces 27'*a,b* of the lower tabs 25*a'* and 25*b'* of the brake pad 20'.

In the embodiments illustrated in FIGS. 5-7, each of the front section 15*a'* and the back section 15*b'* of the caliper housing body 14 may house a monolithic brake pads 20', a pair of stop/guides 79, a piston array 29 and a pair of retractors 40, wherein the retractors 40 positively retract each of the monolithic brake pads 20' a prescribed distance D upon release of pressure within the piston arrays 29 as previously discussed in reference to the embodiments shown in FIGS. 1-3 and in reference to FIGS. 8A-E.

It is noteworthy that the aforementioned positive retraction can be achieved with practice of the teachings herein without resort to drilling and tapping the monolithic brake pads 20'. Instead, the monolithic brake pads 20' may be provided with front-facing surfaces 27 which are configured to receive the tips 60 of the torsion arms 44 of the retractors 40 and the front-facing surfaces 27 may be recessed so as to provide clearance between the torsion arms 44 and the rotor 12 and to preserve the useful life of the monolithic brake pad 20'.

It is contemplated that the retractors 40*a,b* may be implemented to contact with other frontal portions of the monolithic brake pad and/or at different locations and/or in different numbers (including only a single retractor 40) other than what is specifically shown in FIGS. 5-7.

Alternative Embodiments

Figure 9A:
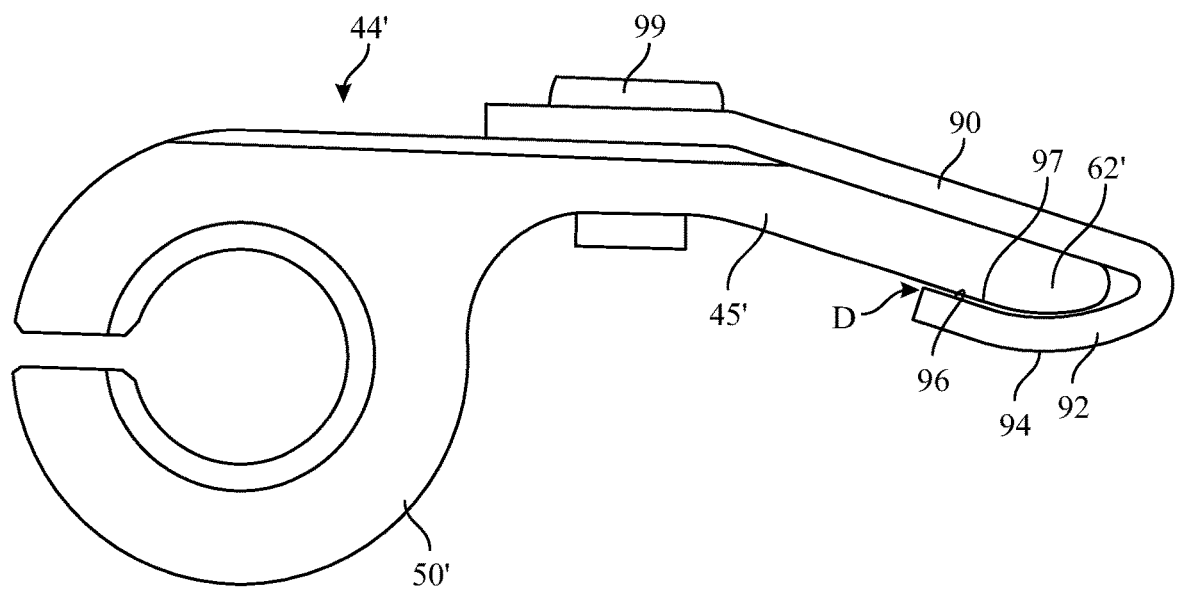
FIG. 9A is a planar side view of a torsion arm constructed in accordance with an alternate embodiment and suitable for use in the brake calipers shown in FIGS. 1 and 4 and other embodiments.
Figure 9B:
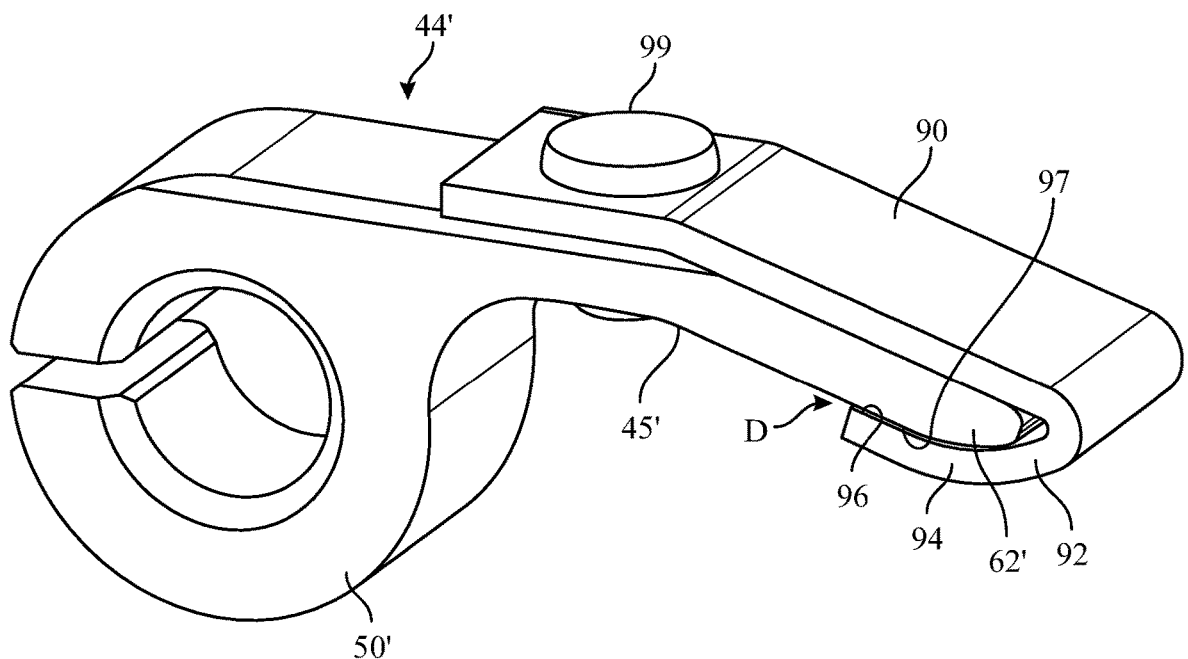
FIG. 9B is a perspective view of the torsion arm shown in FIG. 9A, in accordance with the alternate embodiment shown in FIG. 9A.

Referring now to FIGS. 9A and 9B, in an alternative embodiment, a brake retractor 40 may comprise torsional mount 46 as previously described and torsional arm 44' comprising split ring 50' and a finger 45' configured substantially as previously described but which finger 45' supports a spring 90 which may include an arcuate end portion 92 which may extend about the end portion 62' of the finger 45'. An outer surface 94 of the arcuate end portion 92 of the spring 90 is configured to contact a front-facing surface 27 of a brake pad 20. An inner surface 96 of the arcuate portion 92 of the spring 90 is spaced from an adjacent (opposing) surface 97 of the finger 45' by the prescribed distance D. The spring 90 may be secured to the finger 45' with a rivet 99 or other suitable connection such as a pin or screw. The spring rate of the arcuate end portion 92 of the spring 90 is selected such that the end portion 92 of the spring 90 will deflect the distance D against the end portion 62' of the finger 45' upon advancement of the brake pad 20 by the distance D. The deflection of the spring 90 may be without any cognizable deflection of the finger 45'. Upon further extension of the brake pad 20 beyond the distance D, the torsional fit between the split ring 50' and the associated pin 47 may be overcome in the manner previously described to angularly reset the split ring 50 relative to the pin 47.

By such arrangement, the spring 90 may be selected to provide a desired displacement D and a desired retraction force without change to the remainder of the torsion arm 44'.

It is further contemplated that the teachings herein could be further embodied with any of the following:

an embodiment wherein (1) a rigid (essentially inflexible) torsion arm cooperates with (2) a weaker torsional connection between the rigid torsion arm and the pin 47 and (3) a separate plate 46 and pin 47 together with a stronger torsional connection between the plate 46 and pin 47;

an embodiment wherein (1) a rigid torsion arm cooperates with (2) a weaker torsional connection between the rigid torsion arm and the pin and (3) an integrated pin 47 and plate 46 together with a stronger torsional connection between the plate and the caliper housing body;

an embodiment wherein (1) a rigid torsion arm cooperates with (2) a weaker torsional connection between the rigid torsion arm and the pin 47 and (3) a stronger torsional connection directly between the pin 47 and the caliper housing body 14;

an embodiment wherein the torsion arm is rigid and cooperates with a coil spring or "torsion bar" within (or outside) the pin 47 such that the torsional rate may be selectively changed by changing the coil spring or torsion bar; and/or an embodiment wherein the friction fit between the pin 47 and the split ring 50 of the torsion arm 44 may be adjusted with a tightening screw or a lock nut and bolt 50*a*, operative at the split of the split ring 50. In some embodiments, the lock nut and bolt can be torqued to a value between about 25 and 75 lb/in.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A brake pad retractor system, comprising:
    a torsion arm having a free end portion configured to contact a brake pad of a brake system, and an opposite end portion having an adjustable split ring;
    a torsional mount comprising a pin and an arrangement to support the pin from a housing portion of a brake system at a location adjacent the brake pad, said torsional mount cooperative with the torsion arm such that the split ring of the torsion arm is mounted on the pin of the torsional mount, and the torsion arm has an angular relation with the torsional mount and may be sprung responsively to at least some movement of a brake pad in response to operation of a brake system;

the torsional mount operative such that upon movement of a brake pad by a first distance, the torsion arm is sprung and communicates an action upon the brake pad through a contact between the torsion arm and the brake pad, the communicated action sufficient to positively retract the brake pad upon release of the brake system;

the torsional mount further operative such that upon further movement of a brake pad beyond the first distance the angular relation between the torsion arm and the torsional mount is adjusted responsively to the further movement;

whereby the positive retraction of the brake pad is maintainable as the brake pad undergoes wear.

2. The brake pad system of claim 1, wherein the torsion arm is configured to contact the brake pad free of a rigid connection between the torsion arm and the brake pad.

3. The brake pad system of claim 2, wherein the torsion arm is configured to contact a backplate portion of the brake pad on a side of the backplate supporting a friction generating material.

4. The brake pad system of claim 2, wherein the torsion arm is configured to contact a recess in the brake pad.

5. The brake pad system of claim 1, wherein the torsional mount comprises a pin and an arrangement to support the pin from a caliper housing portion of a brake system at a location adjacent a brake pad of the brake system.

6. The brake pad system of claim 5, wherein the arrangement to support the pin from the caliper housing portion comprises a plate with a flange, the flange connectable with a portion of the caliper housing so as to rotationally fix the plate relative to the caliper housing.

7. The brake pad system of claim 5, wherein the torsional mount rigidly affixes the pin with the caliper housing portion, a portion of the torsion arm being supported at the angular relation from the pin by an adjustable connection which includes a friction fit, such that during the movement of the brake pad by the first distance, the torsion arm is sprung and the adjustable connection maintains the angular relation and such that during movement of the brake pad beyond the first distance, the adjustable is overcome and the angular relation of the tension arm portion is adjusted responsively to the further movement.

8. The brake pad system of claim 7, wherein the torsional mount comprises a plate, the plate being arranged to support the pin such that the pin is in a fixed relation to the caliper housing portion, the adjustable connection being operative between the pin and the torsion arm.

9. The brake pad system of claim 7, wherein the engagement of the opposite end portion of the torsional arm with the torsional mount is configured to impart a resistive torque sufficient to overcome a torquing action communicated to the engagement through the torsion arm during movement of the brake pad along the first distance.

10. The brake pad system of claim 9, wherein the resistive torque is insufficient to overcome the torquing action communicated to the engagement through the torsion arm during movement of the brake pad beyond the first distance.

11. The brake pad system of claim 10, wherein the torsional mount includes a friction fit to generate the resistive torque.

12. The brake pad system of claim 11, wherein the amount of resistive torque between the torsion arm and the pin is adjustable by a change in at least one of an inner diameter of the split ring, an inner surface feature of the split ring, an outer surface feature of the pin, a material of the split ring, a material of the pin, a length of the torsion arm, a surface coating and/or a thickness of the split ring.

13. The brake pad system of claim 1, wherein the torsional mount comprises a plate, the plate being arranged to support the pin such that the pin may rotate relative to the caliper housing portion, the adjustable connection being operative between the pin and the plate.

14. The brake pad system of claim 1, wherein the split ring is adjustable by a change in a diameter of the split ring.

15. The brake pad system of claim 1, wherein the torsional mount further comprises a retainer adapted to avoid inadvertent release of the torsion arm from the torsional mount.

16. The brake pad system of claim 1, wherein the system is configured to retract the brake pad in the range of about 0.001 to about 0.020 inch and the torsional mount allows rotation of the torsion arm upon a level of force being exerted upon the torsion arm in the range of about 25 pounds to 50 pounds.

17. The brake pad system of claim 1, wherein the torsion arm comprises a cantilever portion extending between the free end portion and the opposite end portion; and wherein the engagement of the opposite end portion of the torsional arm with the torsional mount is such that during the movement of the brake pad by the first distance, the cantilever portion displaces substantially without a rotation of the opposite end portion from a first angular position relative to the torsional mount.

18. The brake pad system of claim 17, wherein the engagement of the opposite end portion of the torsion arm with the torsional mount is such that during the movement of the brake pad beyond the first distance, the opposite end portion is caused to responsively rotate from the first angular position to a second angular position relative to the torsional mount.

19. The brake pad system of claim 1, wherein the split ring is provided with a closure mechanism for adjusting an inner diameter of the split ring, whereby the resistive torque may be adjusted.

20. The brake pad system of claim 19, wherein the closure mechanism is a screw or a nut and bolt passing through the split portion of the ring.

21. A brake caliper, comprising:

a caliper housing comprising opposing side portions disposable on opposite sides of a brake rotor;

a brake pad extendably and retractably supported from a side portion of the caliper housing, the brake pad including a braking surface for selectively engaging a side of the brake rotor;

a piston operable to extend the brake pad into and out of frictional engagement with the rotor, and a torsional retractor operative upon the brake pad, the torsional retractor comprising a torsional mount supported from the caliper housing and a torsion arm supported from the torsional mount such that a first portion of the torsion arm is in contact with a portion of the brake pad and such that a second portion of the torsion arm having an adjustable split ring is supported at an angular relation with respect to the torsional mount, the torsional mount including a frictional connection in communication with the torsion arm;

upon the piston extending the brake pad along a first distance, the first portion of the torsion arm is displaced and the frictional connection is sufficient to maintain the angular relation between the second portion of the torsion arm and the torsional mount, whereby the torsion arm is flexed, the frictional engagement allowing the first portion of the torsion arm to rotate responsively to the piston further extending the brake pad beyond the first distance;

so that upon cessation of the extension force by the piston, the torsion retractor positively retracts the brake pad from the rotor consistently through a wear life of the brake pad.

22. The brake caliper of claim 21, wherein the contact between first portion of the torsion arm and the brake pad is free of a rigid connection.

23. The brake caliper of claim 21, wherein the torsional mount comprises a pin and an arrangement to support the pin from the caliper housing at a location adjacent the brake pad.

24. The brake caliper of claim 23, wherein the torsional retractor comprises a plurality of torsional retractors at spaced locations about the brake pad.

25. The brake caliper of claim 24, wherein the torsional mount further comprises a releasable retainer operative to retain the torsion arm against inadvertent release from the torsional mount.

26. The brake caliper of claim 25, wherein at least one of a top portion and bottom portion of the caliper housing includes an opening, at least some of the pins being supported from within the caliper housing such that at least some of the torsional retractors are accessible through the opening.

27. The brake caliper of claim 24, wherein the plurality of torsional retractors are disposed about the brake pad, whereby vibration at the brake pad is attenuated by the contacts between the plurality of torsional retractors and the brake pad.

28. The brake caliper of claim 24, wherein the plurality of torsional retractors are disposed symmetrically about the brake pad.

29. The brake caliper of claim 24, wherein the plurality of torsional retractors are disposed asymmetrically about the brake pad to accommodate operational differences between different sections of the brake pad.

30. The brake caliper of claim 24, wherein the piston comprises a plurality of pistons.

31. The brake caliper of claim 30, wherein the torsional retractors are arranged in a pattern that counteracts moments imparted by a non-uniform extension of the plurality of pistons during a braking action, whereby the braking surface of the brake pad may engage the rotor more uniformly upon extension of the brake pad by the plurality of pistons.

32. The brake caliper of claim 30, wherein the plurality of torsional retractors contact peripheral portions of the brake pad outside of regions of the brake pad contacted by the plurality of pistons.

33. The brake caliper of claim 32, wherein the plurality of pistons act upon a back side of the brake pad and the plurality of torsional retractors contact peripheral portions of the brake pad on a front side of the brake pad.

34. The brake caliper of claim 30, wherein the brake pad comprises mutually opposing first and second brake pads which cooperate with a first torsional retractor and a second torsional retractor, respectively.

35. The brake caliper of claim 34, wherein each of the mutually opposing first and second brake pads comprise a plurality of brake pads.

36. The brake caliper of claim 21, wherein the brake pad comprises mutually opposing first and second brake pads which cooperate with a first torsional retractor and a second torsional retractor, respectively.

37. The brake caliper of claim 36, wherein each of the mutually opposing first and second brake pads comprise a plurality of brake pads.

38. The brake caliper of claim 21, wherein the torsional retractor applies a hold-off torque against an initial extension of the brake pad by the piston, whereby the torsional retractor momentarily delays the initial extension.

39. The brake caliper of claim 38 comprising a plurality of brake calipers, in combination with wheels of an automotive vehicle, wherein at least one of the frictional connection and the first distance of the torsional retractors of different calipers are selected to create a difference in momentary delays in the operation of their associated brake pads.

40. The plurality of brake calipers of claim 39, wherein the momentary delays are selected to provide a front brake bias to the vehicle.

41. The plurality of brake calipers of claim 39, wherein the momentary delays are selected to provide a side brake bias to the vehicle.

42. The brake caliper of claim 21, wherein the split ring of the torsion arm has a nut and bolt passing through the split ring, for adjusting a diameter of the split ring.

* * * * *